E. H. FRENCH & J. R. WITHROW.
PROCESS OF PRODUCING ACETIC ACID.
APPLICATION FILED JULY 9, 1909.
1,104,978.
Patented July 28, 1914.
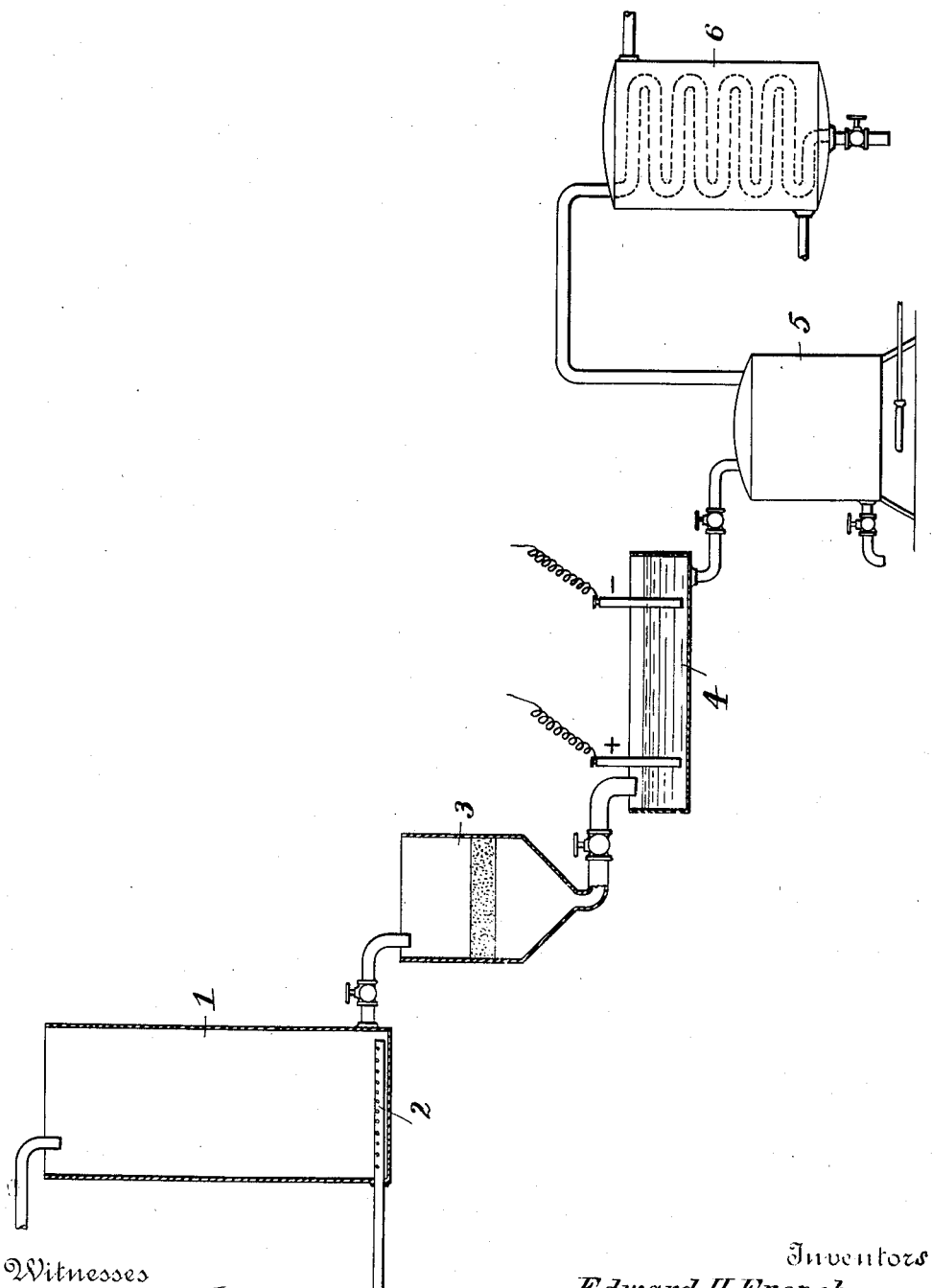
Witnesses
Inventors
Edward H. French
James R. Withrow
by Finckel Finckel
their Attorneys

UNITED STATES PATENT OFFICE.

EDWARD H. FRENCH, OF DAYTON, AND JAMES R. WITHROW, OF COLUMBUS, OHIO.

PROCESS OF PRODUCING ACETIC ACID.

1,104,978.  Specification of Letters Patent.  Patented July 28, 1914.

Application filed July 9, 1909. Serial No. 506,839.

*To all whom it may concern:*

Be it known that we, EDWARD H. FRENCH and JAMES R. WITHROW, citizens of the United States, residing at Dayton, in the county of Montgomery and State of Ohio, and Columbus, in the county of Franklin and State of Ohio, respectively, have invented a certain new and useful Improvement in Processes of Producing Acetic Acid, of which the following is a specification.

Our invention or discovery relates to the process of treating acetic acid for the purpose of purifying it; and consists in the matters hereinafter described and pointed out in the claims.

The accompanying drawing illustrates partly in elevation and partly in section and somewhat conventionally the apparatus that can be used in carrying out the process.

Acetic acid, as at present produced, is made by treating acetate of lime with mineral acid and then distilling off the acetic acid with other volatile substances. Acetate of lime used in the process as heretofore commonly practised so far as we are aware was made by evaporating acetate liquors until they first become of a mushy consistence, and then afterward drying the product on a hot floor or in a vacuum. The acetic acid thus obtained contained pyroligneous and other impurities, which, according to the old practice were removed by distilling it over a permanganate or a bi-chromate.

It is generally known that when a sulfur acid, such as sulfuric acid, is added to acetate of lime for the production of acetic acid, the resulting distillate contains sulfur dioxid, pyroligneous impurities and other impurities. By our present process we propose to partially prevent the formation of these matters by subjecting the acetate of lime in a closed vessel, to a distilling heat preferably in a vacuum with agitation and then adding sulfuric acid to the still, preferably in the form of a spray to give an equal admixture throughout the mass. When this addition is accomplished slowly and with a contemporaneous agitation together with a high vacuum, but little acid is lost through the decomposition of the sulfuric acid and subsequent formation of sulfur dioxid.

In carrying on our process we partially remove the impurities above mentioned by adding powdered or granular charcoal until the distillate becomes thoroughly blackened and blowing air through the mixture. The probable action in this case is that the sulfur dioxid is in part blown out and in part changed to sulfuric acid. We find that charcoal has greater absorptive capacity for wood oils while in the presence of air or other gas which is inert to acetic acid. We then remove the charcoal by filtration or decantation. The liquid is then electrolyzed with a current of such amperage as will pass through the solution without volatilizing the acetic acid, preferably with sodium chlorid or other salt, thereby decomposing all remaining pyroligneous impurities and other foreign substances, such impurities and substances being removed and the acetic acid recovered by ordinary distillation. The amount of current used in any given case is immaterial and may be varied except if too much current is used acid may be lost by vaporization or by decomposition into hydrocarbon and other undesirable bodies. On the other hand with a small current the time of operation is unduly prolongated. The point where volatilization occurs varies with the quantity and character of the solution but such point can easily be observed by those skilled in the art.

We have discovered that the use of electrolysis directly to the distillate without the addition to it of other substances will purify the acetic acid, and we have also discovered that the addition of salts, such as particularly specified, greatly facilitates the electrolytic purification probably because of the chemical action of their nascent ions or components on the impurities in the acid.

In the accompanying drawing 1 designates the tank in which the distillate is treated with charcoal and an inert gas; 2 designates a spray device in the bottom of the tank for injecting the inert gas; 3 designates a filter of ordinary construction arranged to receive the material from the tank 1; the character 4 designates the tank having electrodes therein for electrolytically treating the liquor after filtration; 5 designates the still of ordinary construction used in distillation after the electrolytic treatment and 6 designates the condenser of the still.

The time consumed in the various steps herein described will vary according to the quantity treated but the completion of any particular step in any particular portion of the process can be determined by the observation of the effects stated by those skilled in the art who are carrying it out.

What we claim is:

1. The process of producing purified acetic acid directly from acetate of lime obtained in the destructive distillation of wood comprising in adding a mineral acid thereto, distilling off the acetic acid and then subjecting the distillate to electrolysis maintained below the point at which material decomposition of the acetic acid occurs to remove pyroligneous bodies and foreign volatile acids and oils.

2. The process of obtaining refined acetic acid directly comprising subjecting impure acetic acid to electrolysis maintained below the point at which material decomposition of the acetic acid occurs to remove pyroligneous bodies and foreign volatile acids and oils.

3. The process of obtaining refined acetic acid directly comprising subjecting impure acetic acid to electrolysis maintained below the point at which material decomposition of the acetic acid occurs in conjunction with a salt to remove pyroligneous bodies and foreign volatile acids and oils.

EDWARD H. FRENCH.
JAMES R. WITHROW.

Witnesses to the signature of Edward H. French:
  JOHN TROY,
  S. L. WINSLOW.

Witnesses to the signature of James R. Withrow:
  BENJAMIN FINCKEL,
  GEORGE M. FINCKEL.